United States Patent
Pan et al.

(10) Patent No.: US 9,499,440 B2
(45) Date of Patent: Nov. 22, 2016

(54) REDUCTION AND HARMLESS METHOD FOR RECYCLING HEAVY METAL WASTE

(71) Applicant: UNIVERSITY OF SCIENCE AND TECHNOLOGY BEIJING, Beijing (CN)

(72) Inventors: De an Pan, Beijing (CN); Shen gen Zhang, Beijing (CN); Ling jie Li, Beijing (CN); Bin Guo, Beijing (CN); Bo Liu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 14/419,255

(22) PCT Filed: Mar. 13, 2014

(86) PCT No.: PCT/CN2014/073416
§ 371 (c)(1),
(2) Date: Feb. 3, 2015

(87) PCT Pub. No.: WO2015/106486
PCT Pub. Date: Jul. 23, 2015

(65) Prior Publication Data
US 2016/0257617 A1      Sep. 8, 2016

(30) Foreign Application Priority Data

Jan. 16, 2014 (CN) .......................... 2014 1 0019050

(51) Int. Cl.
| | |
|---|---|
| C04B 28/08 | (2006.01) |
| C01F 11/46 | (2006.01) |
| C22B 7/04 | (2006.01) |
| C22C 11/00 | (2006.01) |

(52) U.S. Cl.
CPC ............. *C04B 28/085* (2013.01); *C01F 11/46* (2013.01); *C22B 7/04* (2013.01); *C22C 11/00* (2013.01)

(58) Field of Classification Search
CPC ................................. A62D 3/33; G21F 9/304
USPC ..................................................... 588/3, 412
See application file for complete search history.

(56) References Cited

U.S. PATENT DOCUMENTS 2,528,103 A    10/1950   Willson

FOREIGN PATENT DOCUMENTS

| CN | 103482586 | 1/2014 |
|---|---|---|
| JP | 07241441 | 9/1995 |

*Primary Examiner* — Edward Johnson
(74) *Attorney, Agent, or Firm* — Michael J. Feigin, Esq.; Feigin & Fridman

(57) ABSTRACT

An amount-reduction, harmless, disposal method for heavy metal waste gypsum (HMWG), which belongs to the technical fields of recycling economy and environmental protection. The HMWG used as raw material is subjected to processes of smelting fluxpreparation, lead smelting, fuming, and geopolymeric gelling, to realize amount-reduction, harmless and resources recycling utilization of heavy metal waste gypsum. The smoke containing sulfur dioxide produced in the smelting process is sent to the acid making system, and the produced dust with heavy metal is sent to the dedicated system for heavy mental disposing. The smoke dust produced in the fuming process is returned to the lead smelting system. The secondary HMWG produced in the acid making system would be returned to the preparation process of smelting flux. And the final products would be sulfuric acid and geopolymer material.

4 Claims, 1 Drawing Sheet

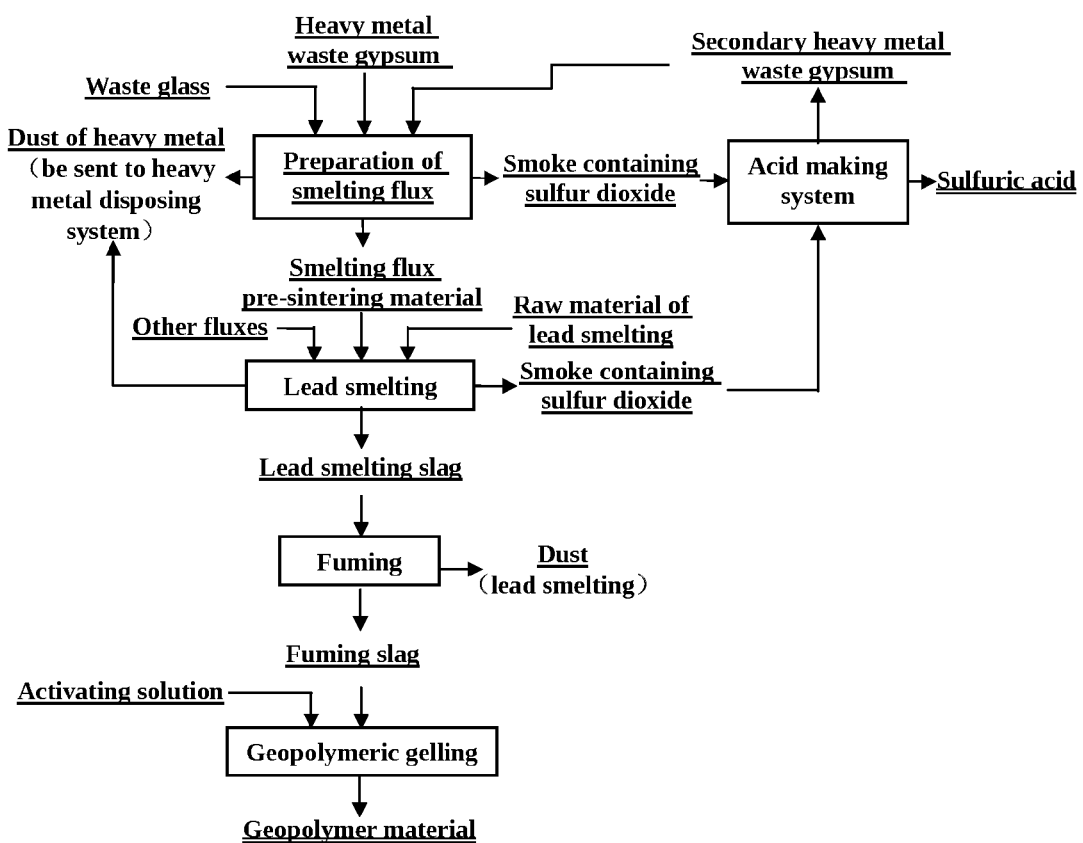

REDUCTION AND HARMLESS METHOD FOR RECYCLING HEAVY METAL WASTE

TECHNICAL FIELD

In this invention, some processes and technologies are put forward such as the preparation of lead smelting flux by heavy metal waste gypsum, collocation lead smelting, fuming of lead slags, and the preparation of geopolymer by fuming slags. It belongs to technical fields of recycling economy and environmental protection.

BACKGROUND

With the development of modern industry, the volume of gypsum in storage which is the by-product let out in processes of modern industry is on the increase with each passing day. For example, in the Qingshuitang industrial district of the Zhuzhou city in China, over 200,000 tons of heavy metal waste gypsum are produced annually up to 2013s, while there was no efficient method to utilize these waste gypsum comprehensively. There are nearly one hundred acres has been occupied. Even Xingjian River is polluted severely. As well as that is great waste of resource. Therefore, effective technologies of resourceful treatment and industrialization production are urgent to develop. Consequently, integrated utilization of the industrial by-product waste gypsum begins to be noticed and paid attentions, even some experts come up with the idea that nature gypsum the raw material can be replaced by the by-product gypsum to produce sulfuric acid.

Nowadays, the integrated utilization for waste gypsum has been applied to three aspects, primarily, as the following:

Firstly, the application in the field of architecture [Brick and Title World, 2008, (2): 23-2] that waste gypsum is directly used as gypsum plaster, gypsum wallboard, and gypsum blocks, primarily. Secondly, it is the utilization in the field of cement [China Building Material, 1995, (7): 27-2; Journal of Chemical Industry and Engineering, 2003, (3): 18-20; Cement, 2007, 8: 16-1; Study on Modified Phosphogypsum Used as Cement Setting Time Agent (dissertation), 2007; Cement and Concrete Research, 1989, 19(3): 377-384], in which waste gypsum is mainly recycled in the preparation of cement and cement retarder. Thirdly, the application in the field of agriculture, waste gypsum is treated as soil amendment and fertilizer, primarily, wherein the soil amendment is relied on the exchange interaction between waste gypsum and the sodium ions in sodium bicarbonate soil. While the reaction between waste gypsum and ammonium carbonate fertilizer is utilized to add the nutrition of sulfur to fertilizer.

As to the application of heavy metal waste gypsum in the field of architecture, the most difficult and most critical problem is that a certain amount of heavy metal is still residual in waste gypsum. So when it is directly used as construction material or admixture without removing heavy metal, this would lead to direct or potential heavy mental pollution. Therefore, the recycling method of the building material preparation can not meet the demand of the disposition of heavy metal waste gypsum. According to the Cement Kiln Co-processing Solid Waste Pollution Control Standards and the National Standard Cement Industry Emission Standard Atmospheric People's Republic of China implemented on March 1 this year, higher requirements to cement kiln co-processing solid waste would be put forward, as well as the preparation of sulfuric acid and cements, and cement-coagulation agents by heavy metal waste gypsum would be restrained strictly. As a result, the demand for the disposition of heavy metal waste gypsum can not be satisfied with the application in the field of cement. Then the application of heavy metal waste gypsum in the field of agriculture would be restricted in the process of extension and application for the existence of heavy metal. In conclusion, now, the demand for the disposition of heavy metal waste gypsum can not be satisfied with the comprehensive recycling method of waste gypsum, and we have no time to delay the research of the harmless method of recycling heavy metal waste gypsum.

There are affluent calcium and sulfur in waste gypsum. More and more attentions have been paid to the research for comprehensive application of calcium and sulfur, nowadays. Many scholars have studied the decomposition characteristics of waste gypsum in different atmospheres [Environmental Science and Technology. 2010, 12(33):144-148], with different reducing agents [J. Chem. Thermodynamics, 2013, 57: 39-45; Chemical Engineering Research and Design, 2011, 89: 2736-2741]. The study aimed to lower the decomposition temperature by mixing a certain amount of reducing agents or keeping it in the low oxygen atmosphere (reducing atmosphere or protecting atmosphere of nitrogen). Moreover many scholars have been trying to apply the study to industrial production. However, there are some crucial problems with the traditional, mainstream disposal method, as the following: (1) The sintering temperature is too high, and the atmosphere is too demanding; it has been proved that the temperature of the decomposition of gypsum is about 1600° C. according to traditional theory and practice, while the decomposition temperature will lower to 1100° C. in the protecting atmosphere of nitrogen with some reducing agents such as coal or lower oxygen reducing atmosphere. (2) As the decomposition happens in protecting atmosphere of nitrogen and reducing atmosphere, the concentration of sulfur dioxide reduces in tail gas, and then it is more difficult for sulfur dioxide to be collected, leading to the rise of the investment in environmental protection. (3) Difficulties in the extension of traditional disposal method, the lack of scientific theoretical research, rigorous demand for the production environment, and the uncontrollability of the reaction process. Moreover, the national standards can not be satisfied with the vast majority recycling products of waste gypsum. All of those result in the deficient utilization of waste gypsum. (4) The by-product sulfur is produced easily in the decomposition process, leading to problems such as scorification, agglomeration and jamming in facilities. Above all, the trend of waste gypsum resourceful utilization containing calcium and sulfur is to develop the decomposition technology of waste gypsum without reducing agents or protecting atmosphere.

In lead smelting industry, it needs a great amount of lime to be used as slag former. Meanwhile, it requires complete system for acid making and heavy metal disposal (smoke, dust, and wastewater). The sulfur dioxide smoke obtained in the process of heavy metal waste gypsum decomposition, can be used in the acid making system to realize the comprehension utilization of sulfur. And the product calcium oxide obtained in decomposition can be used as slag former for lead smelting. Moreover, heavy metal smokes and dust would be respectively disposed in corresponding systems for heavy metal to avoid the secondary pollution of heavy metal. In all, it is far-reaching that have the heavy metal waste gypsum recycled as the available resource for the slag former of lead smelting, avoiding secondary pollution of heavy metal waste gypsum. And the application will realize turning waste into wealth, which has well economic and remarkable environmental benefit.

The principal elements in the lead fuming furnace slag are Si, Ca, Fe and O. It also contains some heavy metals such as Zn, Pb, Cr, and Cu. The total amount of the heavy metals exceeds 5%. Direct application of the lead fuming furnace slag in building and road construction material will cause secondary pollution.

Geopolymer is a kind of three-dimensional network gel with amorphous and quasi crystalline characteristics, polymerized by silicon-oxygen and aluminum-oxygen tetrahedron polymerization. Geopolymer could substitute for ordinary cement in many applications. Compared to ordinary cement in the aspect of heavy metal solidification, geopolymer has the following advantages: (1) better early age strength and mechanical properties; (2) better acid or alkali resistance; (3) green energy-saving and environment friendly; (4) better heavy metals immobilization effect. Geopolymer has a kind of "quasi crystalline" structure composed by the cyclic molecules chain. The combination of the cyclic molecules forms a closed hollow space, which metal ion and other poisonous substance can be segmented and surrounded inside and heavy metal ion can be adsorbed by aluminum ion in the skeleton.

SUMMARY OF THE INVENTION

The purpose of this invention is aimed at the problems which heavy metal is exceeding in the process that heavy metal waste gypsum is used to prepare building materials directly, as well as in the process of sulfuric acid making with coal the reducing agent, the reaction temperature is too high and the reaction atmosphere is too demanding. This invention is to provide a method that adopts the synergism treatment process with waste glass, to lower the demands of reaction temperature and atmosphere, and prepare pre-sintering material and sulfuric acid. The smelting flux pre-sintering and other fluxes are mixed together to smelt lead. Then the lead smelting slags obtained in preceding step are sent to fuming furnace, and the products that fuming slags of heavy metal are used to prepare geopolymer matrix, realizing the harmlessness and resource utilization of waste slags. The heavy metal waste gypsum produced in the sulfuric acid preparation can be reused in the preparation process of smelting flux to realize the reduction of heavy metal waste gypsum indeed. The heavy metal dust produced in process of smelting flux and lead smelting will be sent to heavy metal treatment system matched with lead smelting system. And the dust obtained in the fuming process will be disposed by lead smelting system to avoid the secondary pollution of heavy metal realizing harmlessness in disposal process in reality.

In this invention, heavy metal waste gypsum is used as raw material and sent to the processes such as smelting flux preparation, lead smelting, fuming, gelatinize compounding. Eventually the products that sulfuric acid and geopolymer gelatinize matrix are obtained. It comprises particularly the following steps:

(1) Smelting flux preparation: Heavy metal waste gypsum and waste glass are mixed and ball-milled. The mass ratio between sulfur dioxide and calcium oxide in the mixture is 1:1~3:1. Then the mixture is treated in heat treatment furnace. In the heat treatment, the range of temperature is 800° C.~1100° C., and the heating time is 0.5~2 h in air atmosphere, obtaining smelting flux pre-sintering. The smoke containing sulfur dioxide produced in heat treatment process are sent to the sulfuric acid making system, to obtain sulfuric acid and the by-product that secondary heavy metal waste gypsum. Then the secondary heavy metal waste gypsum is disposed again by the preparation process of smelting flux. The metal dust produced in the heat treatment is sent to the heavy disposal metal system matched with lead smelting system.

(2) Lead smelting: the smelting flux pre-sintering obtained by the step (1), other smelting fluxes and raw material for lead smelting are mixed and ball-milled, wherein other smelting fluxes are the mixture of limestone, quartz sand and scrap iron. When mixed, the mass ratio between mixture of smelting flux and other smelting fluxes, and raw material of lead smelting is 10:100~15:100. In the ball-milling mixture, the range of mass ratio between sulfur dioxide and Fe is 0.8~1.0, and the range of mass ratio between sulfur dioxide and calcium oxide is 1.50~1.65. The mixture would be sent to lead smelting apparatus, and get lead smelting slags. The smokes containing sulfur dioxide and heavy metal dust are respectively sent to the sulfuric acid preparation system and heavy metal disposal system.

(3) Fuming: The lead smelting slags obtained in step (2) would be reused in the fuming furnace, getting fuming slags. As well as the dust that produced in fuming process would be sent to the process of lead smelting.

(4) Geopolymeric gelling: The fuming slags obtained in step (3) are ground by a mechanical method to a voluminal median diameter of 100 μm, and then activating solution was added thereto and stirred for 5~20 min; afterwards the resultant is casted into mould and cured, getting geopolymer material; in the activating solution, the mass ratio of fuming slag was 0.40~0.56, and the activating solution was composed of NaOH, $H_2O$, and Sodium silicate hydrate, namely $Na_2O.nSiO_2.mH_2O$, and the solute in activating solution was calculated with $Na_2O$ and $SiO_2$, the proportion of $SiO_2$ was 10~18 wt %, and the proportion of $Na_2O$ was 6~25 wt %, and in case that the proportion of $SiO_2$ is 10~18 wt %, if the content of $Na_2O$ in the activating solution was less than 6~25 wt %, then NaOH would be added to meet the demand of Na ion. The curing is divided to two stages: low temperature curing and high temperature curing; the low temperature curing: the curing temperature is 30~40° C., the curing time is 1~24 h, and the relative humidity is 20~80%; the high temperature curing, the curing temperature is 60~90° C., the curing time is 1~24 h, and the relative humidity is 20~80%.

The advantages of this invention rest with some points, as the following: in the co processing method with waste glass put forward in this invention; heavy metal waste gypsum and waste glass are treated as main raw materials of smelting flux, reacting in lower temperature (glass-transition temperature) and ordinary atmosphere, which causes the change of controlling process from absolute solid-solid reaction to solid-liquid reaction. In this case, the decomposition of heavy metal waste gypsum can occur in lower temperature and ordinary atmosphere, and the demand of heavy metal waste gypsum for reaction temperature and atmosphere is reduced. The product geopolymer can meet the leaching toxicity standard and be applied to building material. Therefore this invention is beneficial to economy, environment, and society, and there are some features such as simple, stability in the production, and environmental protection.

DESCRIPTION OF FIGURES

As shown as FIG. 1, it is the process flow diagram of a reduction and harmless method for recycling heavy metal waste gypsum.

DETAILED DESCRIPTION OF EMBODIMENTS OF THE DISCLOSED TECHNOLOGY

Example 1

After drying, heavy mental waste gypsum and waste glass were mixed by ball milling. In the ball-milling mixture, the mass ratio between sulfur dioxide and calcium oxide was 1:1. The mixture was heated in heat treatment furnace with the temperature of 800° C., the heating time of 0.5 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxes, and raw material of lead smelting was 10:100. In the ball-milling mixture, the mass ratio between sulfur dioxide and Fe was 0.8, and the mass ratio between sulfur dioxide and calcium oxide was 1.50. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 90±10 μm, and then activating solution was added thereto and stirred for 5 min, afterwards the resultant is casted into mould and cured. The activating solution was composed of NaOH, $H_2O$, and Sodium silicate hydrate, ($Na_2O.nSiO_2.mH_2O$). The solute in activating solution was calculated with $Na_2O$ (NaOH calculated with $Na_2O$) and $SiO_2$. In activating solution, the proportion of $SiO_2$ was 10 wt %, and the proportion of $Na_2O$ was 25 wt %. The mass ratio of activating solution and fuming slags was 0.50. In the stage of low temperature curing, the curing temperature was 30° C., and the curing time was 1 h; and the relative humidity was 20%. While in the stage of high temperature curing, the curing temperature was 60° C., the curing time was 2 h, the relative humidity was 20%. After curing, the geopolymer was kept in air until the age of 28 days. Then its compressive strength measured would be 31.54 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.146 mg/L, 0.054 mg/L, 0.154 mg/L, and 0.032 mg/L respectively.

Example 2

After drying, heavy mental waste gypsum and waste glass were mixed by ball milling. In the ball-milling mixture, the mass ratio between sulfur dioxide and calcium oxide was 3:1. The mixture was heated in heat treatment furnace with the temperature of 1100° C., the heating time of 2 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxes, and raw material of lead smelting was 15:100. In the ball-milling mixture, the mass ratio between sulfur dioxide and Fe was 1.0, and the mass ratio between sulfur dioxide and calcium oxide was 1.65. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 70±10 μm, and then activating solution was added thereto and stirred for 10 min, afterwards the resultant is casted into mould and cured. The activating solution was composed of NaOH, $H_2O$, and Sodium silicate hydrate, ($Na_2O.nSiO_2.mH_2O$). The solute in activating solution was calculated with $Na_2O$ (NaOH calculated with $Na_2O$) and $SiO_2$. In activating solution, the proportion of $SiO_2$ was 12 wt %, and the proportion of $Na_2O$ was 25 wt %. The mass ratio of activating solution and fuming slags was 0.56. In the stage of low temperature curing, the curing temperature was 40° C., and the curing time was 10 h; and the relative humidity was 40%. While in the stage of high temperature curing, the curing temperature was 65° C., the curing time was 10 h, the relative humidity was 30%. After curing, the geopolymer was kept in air until the age of 28 days. Then its compressive strength measured would be 32.34 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.174 mg/L, 0.044 mg/L, 0.186 mg/L, and 0.042 mg/L respectively.

Example 3

After drying, heavy mental waste gypsum and waste glass were mixed by ball milling. In the ball-milling mixture, the mass ratio between sulfur dioxide and calcium oxide was 2:1. The mixture was heated in heat treatment furnace with the temperature of 900° C., the heating time of 1 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxs, and raw material of lead smelting was 12:100. In the ball-milling mixture, the mass ratio between sulfur dioxide and Fe was 0.9, and the mass ratio between sulfur dioxide and calcium oxide was 1.6. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 50±10 μm, and then activating solution was added thereto and stirred for 15 min, afterwards the resultant is casted into mould and cured. The activating solution was composed of NaOH, $H_2O$, and Sodium silicate hydrate, ($Na_2O \cdot nSiO_2 \cdot mH_2O$). The solute in activating solution was calculated with $Na_2O$ (NaOH calculated with $Na_2O$) and $SiO_2$. In activating solution, the proportion of $SiO_2$ was 14 wt %, and the proportion of $Na_2O$ was 22 wt %. The mass ratio of activating solution and fuming slags was 0.46. In the stage of low temperature curing, the curing temperature was 35° C., and the curing time was 24 h; and the relative humidity was 60%. While in the stage of high temperature curing, the curing temperature was 85° C., the curing time was 15 h, the relative humidity was 60%. After curing, the geopolymer was kept in air until the age of 28 days. Then its compressive strength measured would be 32.87 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.134 mg/L, 0.034 mg/L, 0.196 mg/L, and 0.048 mg/L respectively.

Example 4

After drying, heavy mental waste gypsum and waste glass were mixed by ball milling. In the ball-milling mixture, the mass ratio between sulfur dioxide and calcium oxide was 1.5:1. The mixture was heated in heat treatment furnace with the temperature of 1000° C., the heating time of 1.5 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxs, and raw material of lead smelting was 14:100. In the ball-milling mixture, the mass ratio between sulfur dioxide and Fe was 0.95, and the mass ratio between sulfur dioxide and calcium oxide was 1.55. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 50±10 μm, and then activating solution was added thereto and stirred for 10 min, afterwards the resultant is casted into mould and cured. The activating solution was composed of NaOH, $H_2O$, and Sodium silicate hydrate, ($Na_2O \cdot nSiO_2 \cdot mH_2O$). The solute in activating solution was calculated with $Na_2O$ (NaOH calculated with $Na_2O$) and $SiO_2$. In activating solution, the proportion of $SiO_2$ was 16 wt %, and the proportion of $Na_2O$ was 17 wt %. The mass ratio of activating solution and fuming slags was 0.43. In the stage of low temperature curing, the curing temperature was 38° C., and the curing time was 24 h; and the relative humidity was 80%. While in the stage of high temperature curing, the curing temperature was 85° C., the curing time was 20 h, the relative humidity was 80%. After curing, the geopolymer was kept in air until the age of 28 days. Then its compressive strength measured would be 36.56 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.125 mg/L, 0.035 mg/L, 0.164 mg/L, and 0.056 mg/L respectively.

Example 5

After drying, heavy mental waste gypsum and waste glass were mixed by ball milling. In the ball-milling mixture, the mass ratio between sulfur dioxide and calcium oxide was 1.8:1. The mixture was heated in heat treatment furnace with the temperature of 1050° C., the heating time of 1.2 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxs, and raw material of lead smelting was 13:100. In the ball-milling mixture, the mass ratio between sulfur dioxide and Fe was 0.95, and the mass ratio between sulfur dioxide and calcium oxide was 1.63. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 90±10 μm, and then activating solution was added thereto and stirred for 15 min, afterwards the resultant is casted into mould and cured. The activating solution was composed of NaOH, $H_2O$, and Sodium silicate hydrate, (Na$_2$O.nSiO$_2$.mH$_2$O). The solute in activating solution was calculated with Na$_2$O (NaOH calculated with Na$_2$O) and SiO$_2$. In activating solution, the proportion of SiO$_2$ was 18 wt %, and the proportion of Na$_2$O was 12 wt %. The mass ratio of activating solution and fuming slags was 0.40. In the stage of low temperature curing, the curing temperature was 35° C., and the curing time was 20 h; and the relative humidity was 40%. While in the stage of high temperature curing, the curing temperature was 90° C., the curing time was 24 h, the relative humidity was 60%. After curing, the geopolymer was kept in air until the age of 28 days. Then its compressive strength measured would be 35.93 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.165 mg/L, 0.025 mg/L, 0.143 mg/L, and 0.035 mg/L respectively.

Example 6

After drying, heavy mental waste gypsum and waste glass were mixed by ball milling. In the ball-milling mixture, the mass ratio between sulfur dioxide and calcium oxide was 2.5:1. The mixture was heated in heat treatment furnace with the temperature of 950° C., the heating time of 1.5 h and the atmosphere of air, obtaining smelting flux pre-sintering material. The sulfur-containing smokes were sent to the acid making system. Then sulfuric acid and by-product secondary heavy metal waste gypsum are obtained, and the latter was disposed by the preparation system of smelting flux. The heavy metal dust produced in heat treatment process was sent to heavy metal disposal system matching lead smelting. The smelting flux pre-sintering, other smelting fluxes and raw materials for lead smelting were mixed and ball-milled. Among the mixture, other smelting fluxes were the mixture of limestone, quartz sand and scrap iron. When mixed, the mass ratio between the mixture of smelting flux and other smelting fluxs, and raw material of lead smelting was 12:100. In the ball-milling mixture, the mass ratio between sulfur dioxide and Fe was 0.93, and the mass ratio between sulfur dioxide and calcium oxide was 1.58. The mixture was disposed in lead smelting furnace to smelt lead, getting lead smelting slags. Obtained in the process of lead smelting, the sulfur-containing smokes and the heavy metal dust were respectively sent to the sulfuric acid making system and disposition system of heavy metal. Lead smelting slags were disposed in fuming furnace, obtaining fuming slags. Meanwhile the dust produced in fuming process was sent to the process of lead smelting.

The fuming slags obtained in step (3) are ground by a mechanical method to a voluminal median diameter of 50±10 μm, and then activating solution was added thereto and stirred for 20 min, afterwards the resultant is casted into mould and cured. The activating solution was composed of NaOH, H$_2$O, and Sodium silicate hydrate, (Na$_2$O.nSiO$_2$.mH$_2$O). The solute in activating solution was calculated with Na$_2$O (NaOH calculated with Na$_2$O) and SiO$_2$. In activating solution, the proportion of SiO$_2$ was 18 wt %, and the proportion of Na$_2$O was 6 wt %. The mass ratio of activating solution and fuming slags was 0.50. In the stage of low temperature curing, the curing temperature was 37° C., and the curing time was 15 h; and the relative humidity was 40%. While in the stage of high temperature curing, the curing temperature was 90° C., the curing time was 24 h, the relative humidity was 40%. After curing, the geopolymer was kept in air until the age of 28 days. Then its compressive strength measured would be 33.76 MPa. Then the geopolymer material was crushed to less than 5 mm. The leaching test was based on HJ/T 299-2007 <Solid waste-Extraction procedure for leaching toxicity-Sulphuric acid & nitric acid method>. The concentrations of heavy metal ions in leaching solution were tested. The concentration of Zn, Pb, Cu, and Cr is 0.143 mg/L, 0.056 mg/L, 0.125 mg/L, and 0.043 mg/L respectively. The 28 days compressive strength of the obtained geopolymer material exceeds 30 MPa and the geopolymer meets the identification standards for heavy metal leaching toxicity. It is achieved an amount-reduction, harmless disposition of heavy metal waste gypsum and resource utilization of fuming slag. The invention has a simple process, a stable and environment-friendly production procedure.

The invention claimed is:

1. A disposal method for heavy metal waste gypsum, comprising the following steps:
   (1a) a step of smelting flux preparation wherein, in order dried heavy metal waste gypsum and waste glass are mixed by ball milling into a mixture,
      the mixture is heated in a heat treatment furnace, obtaining pre-sintering material of smelting flux;
      smoke containing sulfur dioxide produced from placing the mixture in the heat treatment furnace is sent to an acid making system producing sulfuric acid and a secondary heavy metal waste gypsum;
   (1b) returning the secondary heavy metal waste gypsum produced in the acid making system and further carrying out said smelting flux preparation described in steps (1a) partially substituting said secondary heavy metal waste gypsum for said dried heavy metal waste gypsum
   (2) sending dust comprising heavy metal produced in said heat treatment furnace to a heavy metal disposal system comprising lead smelting; said lead smelting comprising steps of ball milling and mixing into a lead smelting mixture the pre-sintering material of smelting flux obtained in steps (1a), additional smelting fluxes and raw material for lead smelting,
      placing said lead smelting mixture in a lead smelting furnace to smelt lead, wherein slags of lead and smoke containing sulfur are produced in the lead smelting furnace, and said slags of lead and dust comprising heavy metal are each sent to one of an acid making system and heavy metal disposition system;
   (3) in a step of fuming,
      placing in a fuming furnace said lead smelting slags are fumed until obtaining a product with different chemical properties from fuming said slags;
      sending dust produced in the step of fuming be smelted in step (2); and
   (4) a step of geopolymeric gelling, wherein:
      the fuming slags obtained in step (3) are ground by a mechanical method to a voluminal median diameter of 100 μm;
      adding an activating solution to said fuming slags and stirring for 5~20 min;
      casting a resultant of said activating solution, said fuming slag into a mold and curing, producing a geopolymer material, wherein a mass ratio of said activating solution to fuming slag is 0.40~0.56, and said activating solution comprises NaOH, H$_2$O, and Sodium silicate hydrate, namely Na$_2$O.nSiO$_2$.mH$_2$O, and the solute in said activating solution was calculated with Na$_2$O (NaOH calculated with $Na_2O$) and $SiO_2$, the proportion of $SiO_2$ was 10~18 wt %, and the proportion of $Na_2O$ was 6~25 wt %, and in case that the proportion of $SiO_2$ is 10~18 wt %, if the content of $Na_2O$ in the activating solution was less than 6~25 wt %, then NaOH would be added to meet the demand of Na.

2. The method of claim 1, wherein a mass ratio between sulfur dioxide and calcium oxide is 1:1~3:1 in the ball milling mixture composed of said heavy metal waste gypsum and waste glass, a heating temperature is 800° C.~1100° C., heating time is 0.5 h~2 h, and heating atmosphere is air.

3. The method of claim 1, wherein smelting fluxes from step (2) are selected from the group consisting of limestone, quartz sand, and scrap iron; and when said smelting flux pre-sintering material, other smelting fluxes, and the raw material for lead smelting are mixed by ball milling, the mass ratio between mixtures of smelting flux pre-sintering material and other smelting fluxes and said raw material for lead smelting is 10:100~15:100, a mass ratio between $SiO_2$ and Fe in said ball milling mixture is 0.8~1.0, and a mass ratio between $SiO_2$ and CaO is 1.50~1.65.

4. The method of claim 1, wherein in step (4), said curing is divided into to two stages including a low temperature curing and high temperature curing stage; wherein said low temperature curing stage is at a temperature of 30~40° C., the curing time is 1~24 h, and the relative humidity is 20~80%; and wherein said high temperature curing stage is at a temperature of 60~90° C., the curing time is 1~24 h, and the relative humidity is 20~80%.

\* \* \* \* \*